US012164634B2

(12) United States Patent
Yang et al.

(10) Patent No.: US 12,164,634 B2
(45) Date of Patent: Dec. 10, 2024

(54) OBJECT INSPECTION VIA OPERATING SYSTEM SHARE FUNCTION

(71) Applicant: McAfee, LLC, San Jose, CA (US)

(72) Inventors: Weiguo Yang, Waterloo (CA); Kathryn Young, Kitchener (CA)

(73) Assignee: McAfee, LLC, San Jose, CA (US)

( * ) Notice: Subject to any disclaimer, the term of this patent is extended or adjusted under 35 U.S.C. 154(b) by 117 days.

(21) Appl. No.: 17/490,737

(22) Filed: Sep. 30, 2021

(65) Prior Publication Data

US 2023/0095080 A1 Mar. 30, 2023

(51) Int. Cl.

*G06F 21/00* (2013.01)
*G06F 21/54* (2013.01)
*G06F 21/55* (2013.01)
*G06F 21/56* (2013.01)
*G06F 21/62* (2013.01)

(52) U.S. Cl.

CPC ............ *G06F 21/565* (2013.01); *G06F 21/54* (2013.01); *G06F 21/554* (2013.01); *G06F 21/566* (2013.01); *G06F 21/6227* (2013.01)

(58) Field of Classification Search

CPC .. G06F 21/6227; G06F 21/566; G06F 21/554; G06F 21/54; G06F 21/565
USPC ............................................................ 726/22
See application file for complete search history.

(56) References Cited

U.S. PATENT DOCUMENTS 8,225,406 B1 * 7/2012 Nachenberg .......... G06F 21/577 726/25
10,083,295 B2 * 9/2018 Spurlock ............. H04L 63/1441
10,129,290 B2 * 11/2018 Thomas .................... H04L 9/32
2007/0250927 A1 * 10/2007 Naik ..................... G06F 21/566 726/22
2012/0066698 A1 * 3/2012 Yanoo ..................... G06F 11/28 719/330
2012/0216028 A1 * 8/2012 Amini ................. G06F 9/44505 713/100
2016/0092179 A1 * 3/2016 Straub ....................... G06F 8/71 717/107
2016/0295264 A1 * 10/2016 Yanovsky ............ H04N 21/482
2016/0378447 A1 * 12/2016 Nandakumar .......... G06F 21/54 717/108
2017/0293947 A1 * 10/2017 Singh ...................... G06F 3/147
2019/0180033 A1 * 6/2019 Born ....................... G06F 16/16
2021/0234684 A1 * 7/2021 Maruyama ............ H04L 9/3013

FOREIGN PATENT DOCUMENTS

EP 4123492 A1 * 1/2023 ......... G06F 21/6236

* cited by examiner

*Primary Examiner* — Josnel Jeudy
(74) *Attorney, Agent, or Firm* — Patent Capital Group

(57) ABSTRACT

A computing apparatus includes a hardware platform having a processor and a memory; an operating system (OS) having a GUI with a user-initiatable share function, and an interface to register a share target for the share function; and instructions encoded within the memory to provide a security agent, the instructions to instruct the processor to: receive from the OS a notification that an object has been shared to the security agent via the share function; responsive to the notification, initiate a security scan or reputation action for the shared object; receive a security or reputation response from the security scan or reputation action; and based at least in part on the security scan or reputation response, display a security or reputation notification via the GUI.

17 Claims, 10 Drawing Sheets

CLIENT DEVICES 110
PROTECTED ENTERPRISE 102
100
LIGHTING 132
THERMOSTAT 134
LOCAL NETWORK 170
72°
USER 120
SECURITY 136
GATEWAY 108
SECURITY SERVICES PROVIDER 190
OTHER DEVICES 140
104
EXTERNAL NETWORK 172
ATTACKER 180

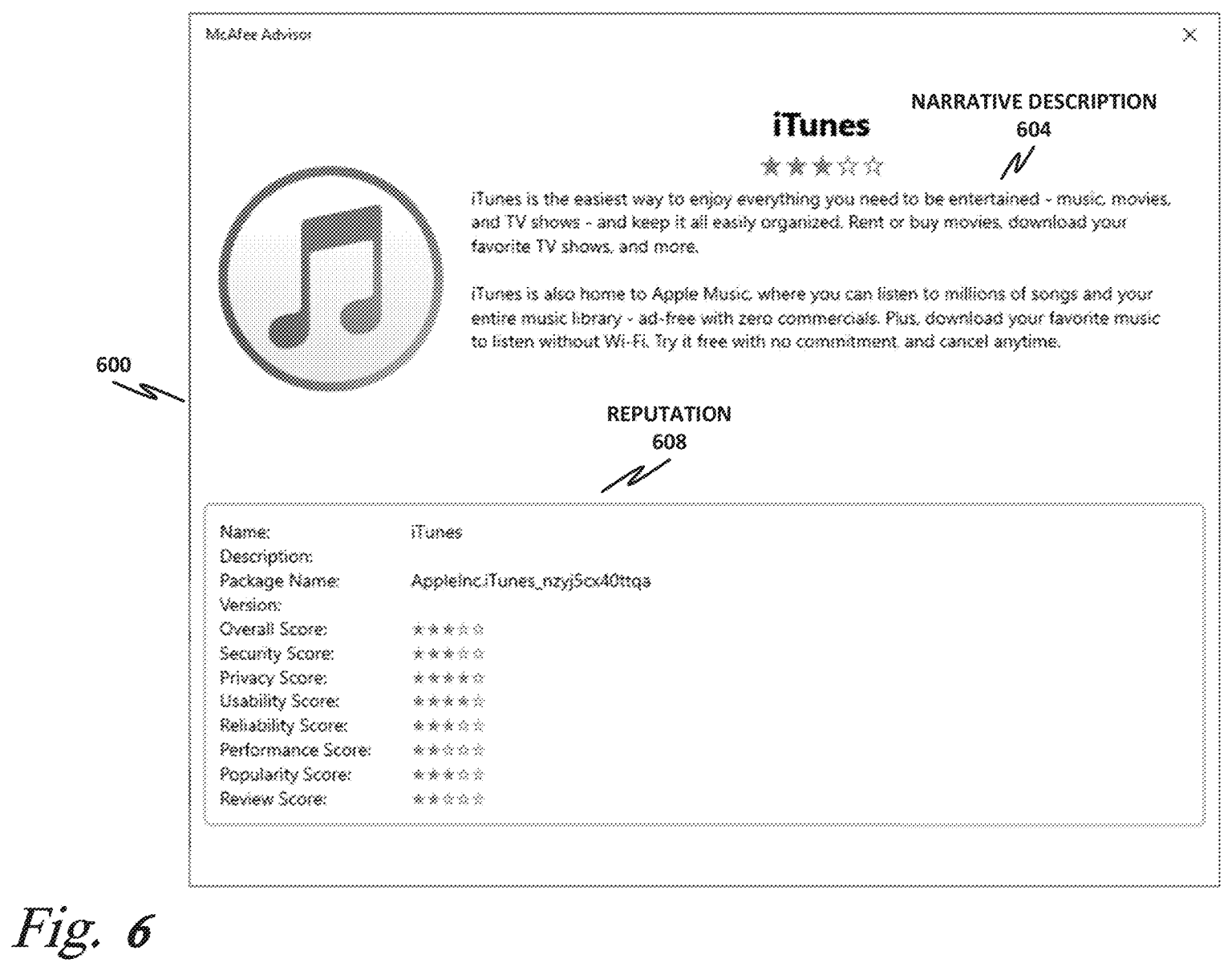

600

McAfee Advisor

X iTunes

NARRATIVE DESCRIPTION 604 iTunes is the easiest way to enjoy everything you need to be entertained - music, movies, and TV shows - and keep it all easily organized. Rent or buy movies, download your favorite TV shows, and more.

iTunes is also home to Apple Music, where you can listen to millions of songs and your entire music library - ad-free with zero commercials. Plus, download your favorite music to listen without Wi-Fi. Try it free with no commitment, and cancel anytime.

REPUTATION 608

Name: iTunes
Description:
Package Name: AppleInc.iTunes_nzyj5cx40ttqa
Version:
Overall Score:
Security Score:
Privacy Score:
Usability Score:
Reliability Score:
Performance Score:
Popularity Score:
Review Score:

Fig. 6

OBJECT INSPECTION VIA OPERATING SYSTEM SHARE FUNCTION

FIELD OF THE SPECIFICATION

This application relates in general to computer security, and more particularly though not exclusively to a system and method for providing object inspection via an operating system share function.

BACKGROUND

Modern computing ecosystems often include "always on" broadband internet connections. These connections leave computing devices exposed to the internet, and the devices may be vulnerable to attack.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

FIGS. 5 and 6 are illustrative graphical elements of a graphical user interface (GUI).

SUMMARY

Figure 1:
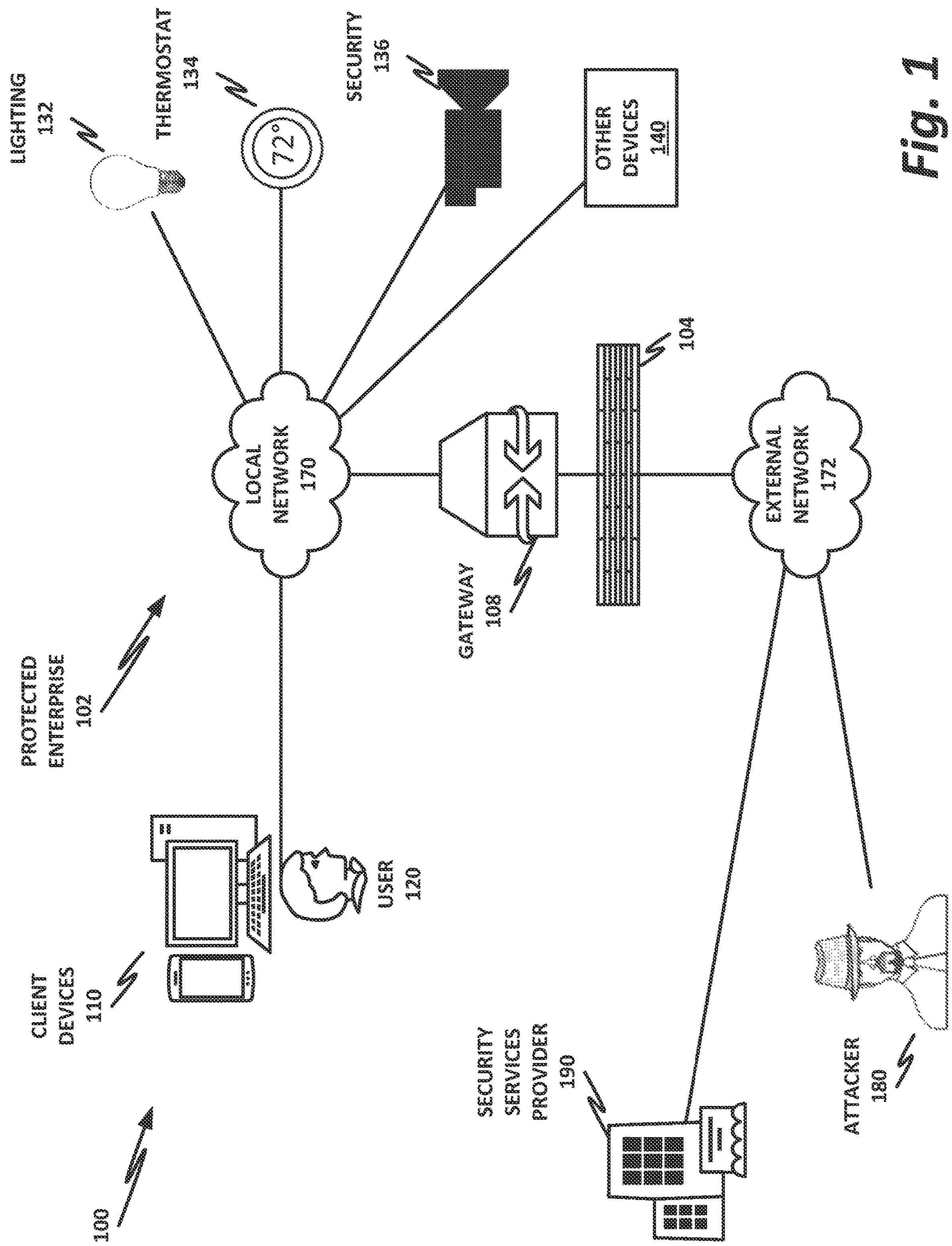
FIG. 1 is a block diagram of selected elements of a security ecosystem.

A computing apparatus includes a hardware platform having a processor and a memory; an operating system having a GUI with a user-initiatable share function, and an interface to register a share target for the share function; and instructions encoded within the memory to provide a security agent, the instructions to instruct the processor to: receive from the operating system a notification that an object has been shared to the security agent via the share function; responsive to the notification, initiate a security scan or reputation action for the shared object; receive a security or reputation response from the security scan or reputation action; and based at least in part on the security scan or reputation response, display a security or reputation notification via the GUI.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Security services providers may have very sophisticated algorithms, including machine learning, deep inspection, sandboxing, static analysis, and dynamic analysis, to name just a few. These functions can be used to determine with a high level of confidence whether an application, file, URL, plug-in, or other object on a computer is malicious versus benign or useful. Some scanning functionality may be provided locally on the device, and even more capable functionality may be provided remotely, such as via a cloud service.

A gateway issue or limiting factor to these highly capable scan functions is that an object must be subjected to the scan. There are many known methods of determining objects to scan, such as scanning a computer for newly identified files or using other contextual information. One valuable source of context is the user of the computing system. A user may know, for example, when she is downloading a file, when she is interacting with a file for the first time, or when she is installing a browser extension for the first time. In some cases, the user may have questions or suspicions about a particular object. In that case, it is valuable to provide a highly intuitive and simple interface for the user to subject the object to a security scan, either locally on the device or via a cloud service.

Several known operating systems provide a so-called "share" function. In some cases, the share function is accessible via a built-in operating system component (such as a file browser), or may be hooked into via various applications such as a web browser, email client, or app store, by way of illustrative and nonlimiting example. The component or application originating the share function may be referred to as the share source or share sender. Human users may use the share function to share objects such as emails, websites, files, pictures, URLs, browser extensions, or apps from an app store with other users who may find them interesting or useful. This share function, or other similar functions such as "send to . . . " may be leveraged to provide the user with an easy and straightforward interface for subjecting an object to a security analysis. Generally, these functions may be characterized as having a GUI, which may be accessible via a context menu, "long press" (e.g., touch and hold on a touchscreen interface), or other menu. The object of the function (e.g., a file, URL, etc.) may be selected by being the object of the context menu or long press (e.g., by right-clicking on the object, long-touching the menu bar in a browser, or similar). The target of the function is a handler, program, or subroutine that receives the shared object (i.e., the object that is shared), and performs an appropriate action. Common targets of share functions may include email, file systems, short messaging service (SMS) users, social media, or others. After receiving the object of the share function, the target application decides what to do with it (e.g., sending it via email or SMS, posting it on the user's social media feed, or similar).

The share feature is a standard user-facing feature across multiple operating systems. For example, Windows 10, Windows 10S, Android, iOS, and various UNIX and Linux operating systems may all provide share or send-to features for the user. In an illustrative use case, a user may identify an object that he is unsure about or that he wishes to subject to a security scan or other local or cloud-based service. The user may install a security agent on his device, and the security agent may register with the share or send-to function, such as by providing an appropriate dynamic link library (.dll), shared object (.so) library, or standalone application that registers with an application programming interface (API) that controls the share function. Once the security agent has registered with the share API, whenever a user wishes to share an object, the security agent may be provided as one of several available share targets. When the user shares the object, such as an application, app store app, browser add-on, email, website, file, or similar, with the security agent target, the security agent may subject the object to additional analysis. This can include, by way of illustrative and nonlimiting example, malware detection, vulnerability scan, privacy analysis, performance metrics, reliability metrics, reputation, user sentiment, age, popularity, or other data about the object.

Advantageously, this solution can work on any operating system that provides a share function or a similar function, such as send-to. The solution can also work with an internal share function of an application. This solution also works on any object that can be the subject of a share action. This can vary depending on operating system, but, in general, operating systems may provide a number of objects that can be shared via the share interface. Thus, the security agent can act on and provide a security reputation for any type of object that may be shared.

Advantageously, this provides a consistent user experience across various operating systems and various types of scannable objects. This increases the familiarity and intuitiveness of the solution, thus making it easier for users to subject objects to additional scanning or reputation services. This ease-of-use makes it more likely that the user will subject the object to the security analysis and thus increases the overall utility of the security service.

In an illustrative use case, the user selects the object (e.g., the object of the share function) and selects the security agent, personal protection service, or similar as the share target. The operating system or source application then sends details about the object of the share function to the security agent (the target). The security agent can either perform a local analysis of the object or offload the analysis to a cloud service.

The product—whether cloud-based or local—analyzes the target and provides security or related information regarding the target. This may include, for example, a reputation for the object which may be a multidimensional reputation for attributes such as overall score, security, privacy, usability, reliability, performance, popularity, and/or user reviews.

The security agent can then provide analysis results and recommendations to the end user via the GUI. In some cases, if the object is known to be malicious or harmful, it may be automatically quarantined or otherwise handled aggressively. If the object has a more benign reputation but is still questionable, the user may have the option of looking at its score to determine whether the benefits outweigh the risks of the application. In some cases, objects with a very high reputation may be provided with a badge or a marker, such as a green checkmark or other indicator, that shows the user that the object may be generally trusted and has a good reputation for usability, performance, privacy, or other factors. The user may then take appropriate action based on the recommendation.

The foregoing can be used to build or embody several example implementations, according to the teachings of the present specification. Some example implementations are included here as nonlimiting illustrations of these teachings.

In various embodiments, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computing apparatus. The computing apparatus also includes a hardware platform may include a processor and a memory. The apparatus also includes an operating system may include a GUI with a user-initiatable share function, and an interface to register a share target for the share function. The apparatus also includes instructions encoded within the memory to provide a security agent, the instructions to instruct the processor to: receive from the operating system a notification that an object has been shared to the security agent via the share function; responsive to the notification, initiate a security scan or reputation action for the shared object; receive a security or reputation response from the security scan or reputation action; and based at least in part on the security scan or reputation response, display a security or reputation notification via the GUI. Other embodiments of this aspect include corresponding computer systems, apparatus, and computer programs recorded on one or more computer storage devices, each configured to perform the actions of the methods.

Implementations may include one or more of the following features. The computing apparatus where the instructions are further to register the security agent as a share target. The operating system is a Microsoft Windows operating system. The operating system is a Macintosh or iOS operating system. The operating system is an android operating system. The operating system is a Linux or UNIX-based operating system. The share function is a send-to function. The security agent may include instructions to analyze the shared object locally. The security agent may include instructions to query a cloud service for security or reputation information about the shared object. The shared object is an application. The shared object is a website or URL. The shared object is a file. The shared object is a browser extension or add-on. The share object is an email. The shared object is a YouTube video or other online media. The shared object is a contact. The shared object is a scannable object. The share function is a built-in share function of the operating system. The instructions are further to take a remedial action based at least in part on the security or reputation response. The security or reputation response includes a reputation for at least one of maliciousness, data security, data privacy, phishing, adware, malware, or utility. Implementations of the described techniques may include hardware, a method or process, or computer software on a computer-accessible medium.

One general aspect includes one or more tangible. The non-transitory computer-readable storage media also includes hook into a function of an operating system (OS) as a target of the function, where the target provides a shared object-to-target infrastructure. The media also includes receive a notification that an object has been shared via the function. The media also includes responsive to the notification, initiate a security or reputation transaction for the shared object. The media also includes receive a security or reputation result from the security or reputation transaction. The media also includes display the security or reputation result to an end user via a GUI of the OS. Other embodiments of this aspect include corresponding computer systems, apparatus, and computer programs recorded on one or more computer storage devices, each configured to perform the actions of the methods.

Implementations may include one or more of the following features. The one or more tangible, nontransitory computer-readable media where the function is a share function. The function is a send-to function. The instructions are further to register as a target of the function with the OS. The OS is a Microsoft Windows OS. The OS is a Macintosh or iOS OS. The OS is an android OS. The OS is a Linux or UNIX-based OS. The instructions are to analyze the shared object locally. The instructions are to query a cloud service for security or reputation information about the shared object. The shared object is an application. The shared object is a website or URL. The shared object is a file. The shared object is a browser extension or add-on. The shared object is a scannable object. The function is a built-in share function of the OS. The instructions are further to take a remedial action based at least in part on the security or reputation response. The security or reputation response includes a reputation for at least one of maliciousness, data security, data privacy, phishing, adware, malware, or utility. Implementations of the described techniques may include hardware, a method or process, or computer software on a computer-accessible medium.

One general aspect includes a computer-implemented method. The computer-implemented method also includes registering a security agent program as a user-selectable share target for a built-in share function of an OS. The method also includes receive from the OS a notification that an object was shared to the security agent program via the built-in share function. The method also includes responsive to the notification, requesting a reputation for the object. The method also includes receiving a reputation for the object. The method also includes based at least in part on the reputation, notifying an end user of the reputation and/or taking a remedial action. Other embodiments of this aspect include corresponding computer systems, apparatus, and computer programs recorded on one or more computer storage devices, each configured to perform the actions of the methods.

Implementations may include one or more of the following features. The method where the OS is a Microsoft Windows OS. An apparatus may include means for performing the method. The means for performing the method may include a processor and a memory. The memory may include machine-readable instructions that, when executed, cause the apparatus to perform the method. The apparatus is a computing system. At least one computer-readable medium may include instructions that, when executed, implement a method or realize an apparatus. The OS is a Macintosh or iOS OS. The OS is an android OS. The OS is a Linux or UNIX OS. The built-in share function is a send-to function. The method may include analyzing the shared object locally. The method may include querying a cloud service for security or reputation information about the shared object. The shared object is an application. The shared object is a website or URL. The shared object is a file. The shared object is a browser extension or add-on. The shared object is a scannable object. The built-in share function is a built-in share function of the OS. The method may include taking a remedial action based at least in part on the reputation. The reputation includes a reputation for at least one of maliciousness, data security, data privacy, phishing, adware, malware, or utility. Implementations of the described techniques may include hardware, a method or process, or computer software on a computer-accessible medium.

A system and method for providing object inspection via an OS share function will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a block diagram of a security ecosystem 100. In the example of FIG. 1, security ecosystem 100 may be an enterprise, a government entity, a data center, a telecommunications provider, a "smart home" with computers, smart phones, and various internet of things (IoT) devices, or any other suitable ecosystem. Security ecosystem 100 is provided herein as an illustrative and nonlimiting example of a system that may employ, and benefit from, the teachings of the present specification.

Security ecosystem 100 may include one or more protected enterprises 102. A single protected enterprise 102 is illustrated here for simplicity, and could be a business enterprise, a government entity, a family, a nonprofit organization, a church, or any other organization that may subscribe to security services provided, for example, by security services provider 190.

Within security ecosystem 100, one or more users 120 operate one or more client devices 110. A single user 120 and single client device 110 are illustrated here for simplicity, but a home or enterprise may have multiple users, each of which may have multiple devices, such as desktop computers, laptop computers, smart phones, tablets, hybrids, or similar.

Client devices 110 may be communicatively coupled to one another and to other network resources via local network 170. Local network 170 may be any suitable network or combination of one or more networks operating on one or more suitable networking protocols, including a local area network, a home network, an intranet, a virtual network, a wide area network, a wireless network, a cellular network, or the internet (optionally accessed via a proxy, virtual machine, or other similar security mechanism) by way of nonlimiting example. Local network 170 may also include one or more servers, firewalls, routers, switches, security appliances, antivirus servers, or other network devices, which may be single-purpose appliances, virtual machines, containers, or functions. Some functions may be provided on client devices 110.

In this illustration, local network 170 is shown as a single network for simplicity, but in some embodiments, local network 170 may include any number of networks, such as one or more intranets connected to the internet. Local network 170 may also provide access to an external network, such as the internet, via external network 172. External network 172 may similarly be any suitable type of network.

Local network 170 may connect to the internet via gateway 108, which may be responsible, among other things, for providing a logical boundary between local network 170 and external network 172. Local network 170 may also provide services such as dynamic host configuration protocol (DHCP), gateway services, router services, and switching services, and may act as a security portal across local boundary 104.

In some embodiments, gateway 108 could be a simple home router, or could be a sophisticated enterprise infrastructure including routers, gateways, firewalls, security services, deep packet inspection, web servers, or other services.

In further embodiments, gateway 108 may be a standalone internet appliance. Such embodiments are popular in cases in which ecosystem 100 includes a home or small business. In other cases, gateway 108 may run as a virtual machine or in another virtualized manner. In larger enterprises that features service function chaining (SFC) or NFV, gateway 108 may be include one or more service functions and/or virtualized network functions.

Local network 170 may also include a number of discrete IoT devices. For example, local network 170 may include IoT functionality to control lighting 132, thermostats or other environmental controls 134, a security system 136, and any number of other devices 140. Other devices 140 may include, as illustrative and nonlimiting examples, network attached storage (NAS), computers, printers, smart televisions, smart refrigerators, smart vacuum cleaners and other appliances, and network connected vehicles.

Local network 170 may communicate across local boundary 104 with external network 172. Local boundary 104 may represent a physical, logical, or other boundary. External network 172 may include, for example, websites, servers, network protocols, and other network-based services. In one example, an attacker 180 (or other similar malicious or negligent actor) also connects to external network 172. A security services provider 190 may provide services to local network 170, such as security software, security updates, network appliances, or similar. For example, MCAFEE, LLC provides a comprehensive suite of security services that may be used to protect local network 170 and the various devices connected to it.

It may be a goal of users 120 to successfully operate devices on local network 170 without interference from attacker 180. In one example, attacker 180 is a malware author whose goal or purpose is to cause malicious harm or mischief, for example, by injecting a malicious object into client device 110. Once malicious object 182 gains access to client device 110, it may try to perform work such as social engineering of user 120, a hardware-based attack on client device 110, modifying storage (or volatile memory), modifying a client application (which may be running in memory), or gaining access to local resources. Furthermore, attacks may be directed at IoT objects. IoT objects can introduce new security challenges, as they may be highly heterogeneous, and in some cases may be designed with minimal or no security considerations. To the extent that these devices have security, it may be added on as an afterthought. Thus, IoT devices may in some cases represent new attack vectors for attacker 180 to leverage against local network 170.

Malicious harm or mischief may take the form of installing root kits or other malware on client devices 110 to tamper with the system, installing spyware or adware to collect personal and commercial data, defacing websites, operating a botnet such as a spam server, or simply to annoy and harass users 120. Thus, one aim of attacker 180 may be to install his malware on one or more client devices 110 or any of the IoT devices described. As used throughout this specification, malicious software ("malware") includes any object configured to provide unwanted results or do unwanted work. In many cases, malware objects will be executable objects, including, by way of nonlimiting examples, viruses, Trojans, zombies, rootkits, backdoors, worms, spyware, adware, ransomware, dialers, payloads, malicious browser helper objects, tracking cookies, loggers, or similar objects designed to take a potentially unwanted action, including, by way of nonlimiting example, data destruction, data denial, covert data collection, browser hijacking, network proxy or redirection, covert tracking, data logging, keylogging, excessive or deliberate barriers to removal, contact harvesting, and unauthorized self-propagation. In some cases, malware could also include negligently-developed software that causes such results even without specific intent.

In enterprise contexts, attacker 180 may also want to commit industrial or other espionage, such as stealing classified or proprietary data, stealing identities, or gaining unauthorized access to enterprise resources. Thus, attacker 180's strategy may also include trying to gain physical access to one or more client devices 110 and operating them without authorization, so that an effective security policy may also include provisions for preventing such access.

In another example, a software developer may not explicitly have malicious intent, but may develop software that poses a security risk. For example, a well-known and often-exploited security flaw is the so-called buffer overrun, in which a malicious user is able to enter an overlong string into an input form and thus gain the ability to execute arbitrary instructions or operate with elevated privileges on a computing device. Buffer overruns may be the result, for example, of poor input validation or use of insecure libraries, and in many cases arise in nonobvious contexts. Thus, although not malicious, a developer contributing software to an application repository or programming an IoT device may inadvertently provide attack vectors for attacker 180. Poorly-written applications may also cause inherent problems, such as crashes, data loss, or other undesirable behavior. Because such software may be desirable itself, it may be beneficial for developers to occasionally provide updates or patches that repair vulnerabilities as they become known. However, from a security perspective, these updates and patches are essentially new objects that must themselves be validated.

Local network 170 may contract with or subscribe to a security services provider 190, which may provide security services, updates, antivirus definitions, patches, products, and services. MCAFEE, LLC is a nonlimiting example of such a security services provider that offers comprehensive security and antivirus solutions. In some cases, security services provider 190 may include a threat intelligence capability such as the global threat intelligence (GTI™) database provided by MCAFEE, LLC, or similar competing products. Security services provider 190 may update its threat intelligence database by analyzing new candidate malicious objects as they appear on client networks and characterizing them as malicious or benign.

Other security considerations within security ecosystem 100 may include parents' or employers' desire to protect children or employees from undesirable content, such as pornography, adware, spyware, age-inappropriate content, advocacy for certain political, religious, or social movements, or forums for discussing illegal or dangerous activities, by way of nonlimiting example.

Because of the presence of these various threats, user 120, while operating client devices 110, may wish to periodically inspect files, programs, applications in an app store, URLs, browser add-ons, or similar to determine whether they are safe for the device. Thus, client devices 110 may provide a share to function as described in this specification. The user 120 may share those objects to a target that includes a security agent operating on a client device 110, and a GUI response may advise the user of reputation data for the shared object. This can include, for example, a narrative text description of the object and reputations for a number of factors, such as an overall score, security, privacy, usability, reliability, performance, popularity, user reviews, or other factors.

Figure 2:
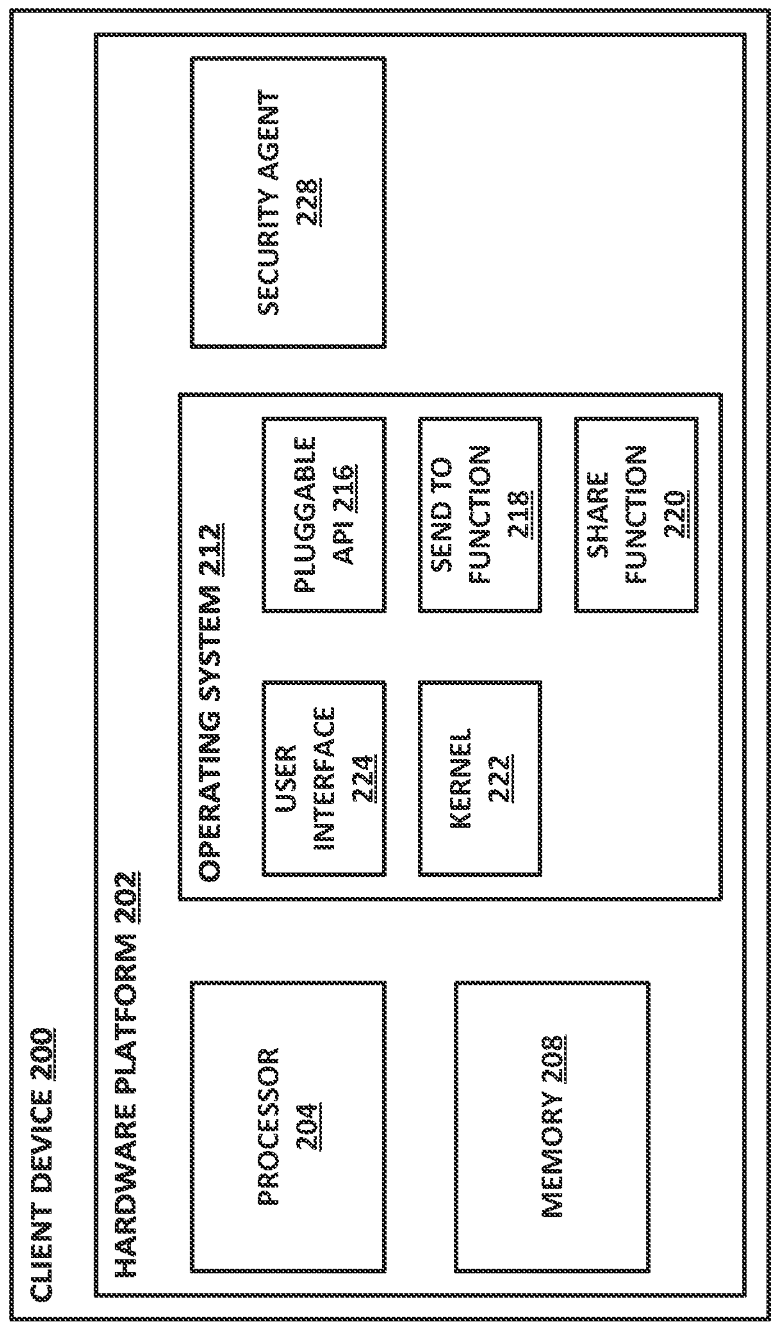
FIG. 2 is a block diagram of selected elements of a client device.

FIG. 2 is a block diagram of selected elements of a client device 200. Client device 200 may be configured to leverage an OS share feature to provide security and related services regarding a shared object. Note that the share feature is a standard user-facing feature on multiple OSs, including Windows 10, Windows 10S, Android, iOS, and some Linux or UNIX OSs. Shared objects may include apps, browser add-ons, websites, files, programs, or similar. Security services that may be provided via the share function include malware detection, vulnerability scans, privacy analysis, performance metrics, reliability metrics, reputation, user sentiment, age, popularity, and others.

Client device 200 may be configured to provide a consistent user experience across OSs as well as scannable objects. This may provide advantages over systems that require the user to access separate solutions for each object type, such as context menu extensions for files, browser extensions for websites, or similar.

In the example of client device 200, a hardware platform 202 is provided, including a processor 204 and memory 208. Further examples of hardware platforms are provided, by way of illustration, in FIGS. 7 and 8 below. Hardware platform 202 also provides an OS 212. Operating system 212 may include standard OS features, such as a kernel 222 and a GUI 224. GUI 224 may provide certain graphical functions, such as a share function 220 and/or a send-to function 218. Other functions for sending or sharing an object may also be provided and may be accessible to the user via user interface 224. Advantageously, a function that has an object and a target can be provided systemwide by the OS and thus may provide a familiar interface that the user may manipulate for many different kinds of objects. For example, the same familiar "share" interface may be provided for files, programs, applications within an app store, URLs, websites, and browser extensions. The share function is provided because these are all examples of objects that users may wish to share with friends, families, colleagues, associates, and others. Advantageously, these same objects are the types of objects that a user may also wish to scan or analyze for security, privacy, functionality, or other concerns.

OS 212 also includes a pluggable application programming interface (API) 216. This may provide hooks into certain functions of the OS whereby an application, such as security agent 228, may register as a target of a send-to or share function. For example, security agent 228 may register as a target of share function 220. After security agent 228 is registered, when a user operates user interface 224 to share an object, security agent 228 appears as a target for the share operation.

Security agent 228 may be, by way of illustrative and nonlimiting example, an antivirus, anti-malware, anti-adware, or other security agent running on client device 200. Security agent 228 may have some capability to locally scan and quantify objects, and may also be able to access cloud-based services via a network interface. Security agent 228 can locally analyze the object of the share function and/or may access a cloud-based service to replace or supplement its local analysis. In the case of a cloud-based service, security agent 228 may send the full object or, alternatively, metadata about the object to the cloud service and receive a reputation in response. If security agent 228 receives a "safe" or "positive" reputation, then the user may have confidence that the object is safe to us. In some cases, security agent 228 may receive a response that the object is unknown or has a suspicious reputation. In yet other cases, security agent 228 may receive a response that the object has a known "malicious" or "negative" reputation. Thus, security agent 228 may graphically display to the end user a GUI element, such as a green checkbox, that visually illustrates that the object is safe, a yellow bar that visually indicates that the object is unknown or questionable, or a red X that indicates the object is unsafe.

Figure 3:
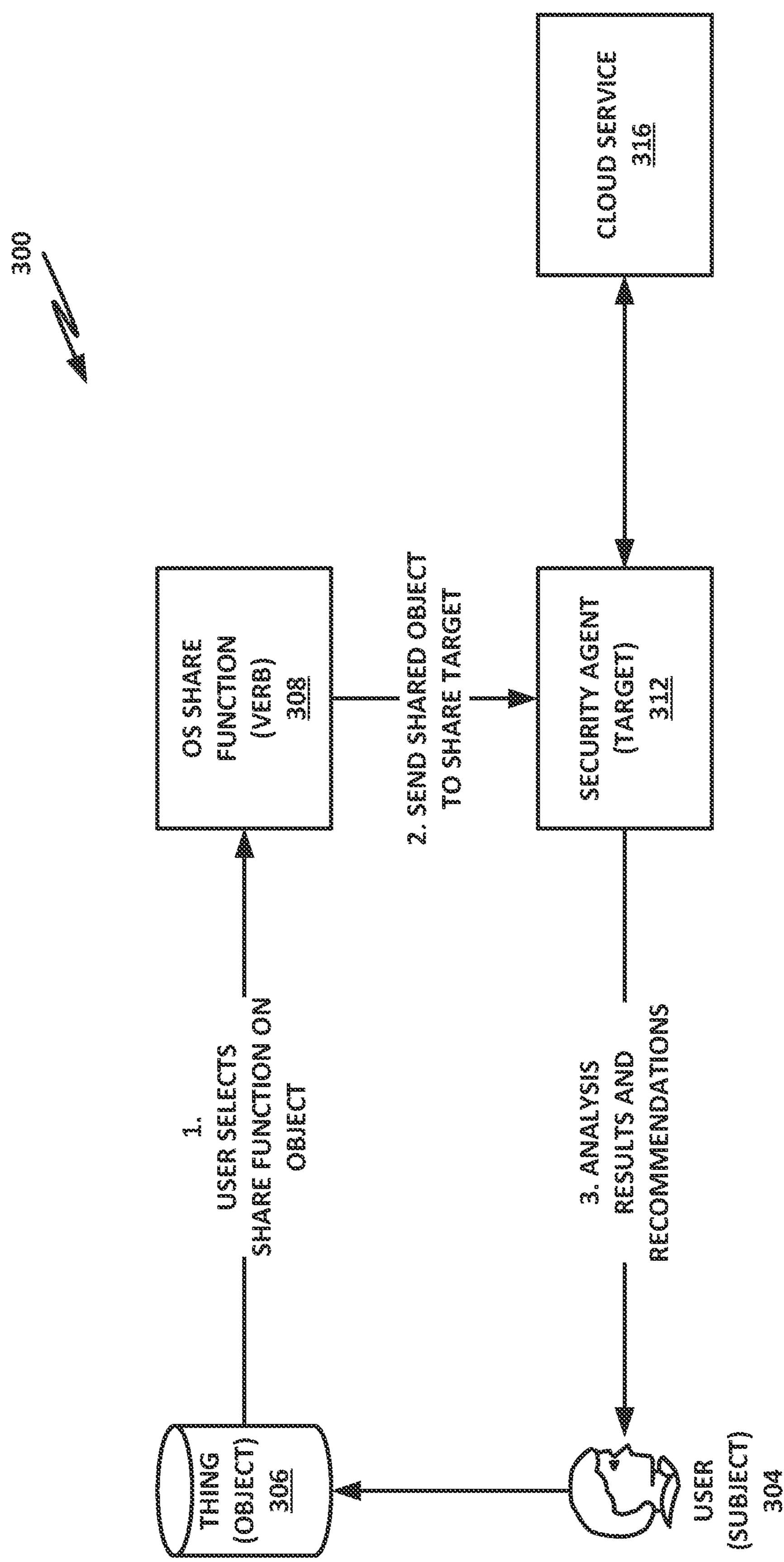
FIG. 3 is a block diagram of selected elements of a security ecosystem for object sharing.

FIG. 3 is a block diagram of selected elements of an object sharing ecosystem 300. Object sharing ecosystem 300 is provided for user 304 to easily assess the security and/or privacy posture of various objects 306.

For example, at operation one, user 304 selects the share service for object 306, such as by manipulating a context menu with a "share" or "send to . . . " in context of object 306. Here, it should be understood that the term "object" is often used to designate a class of things that exist on a computing system, such as memory locations, registers, files, applications, subroutines, jobs, URLs, extensions, websites, or similar. This definition of "object" is applicable in this case, as the "object" of the share feature is an OS thing/object. However, the term "object" is also intended to carry in this context its grammatical sense, in that the thing on the computing system is the "object" of the share function, or in other words, it is the thing being shared. Grammatically, the user (the grammatical "subject") shares (the grammatical "verb") a thing/object (the grammatical "object") to the security agent (the grammatical "indirect object," also called herein the "target").

This initiates an action with the OS share function 308. Security agent 312 may have previously registered as a share target with the OS. Thus, when OS share function 308 receives the share command with the share object 306, OS share function 308 sends the shared object 306 to security agent 312.

Security agent 312 may then locally analyze shared object 306 or optionally access cloud service 316 to receive a reputation for shared object 306. This provides security or related information regarding shared object 306. In the case of a file, the product may also allow the user to upload the file to the cloud for further analysis. Depending on the sensitivity of the file, the user may elect to upload the file or to not upload the file. In some cases, if the user elects not to upload the file, then metadata about the file may be analyzed instead of the content of the file itself.

Using this infrastructure, a user may share various objects with the share target. For example, the user may share an app store application. A personal protection service may provide illustrative services for the shared app including, for example, detecting security vulnerabilities, detecting privacy violations, detecting unnecessary permissions, providing performance and other reputation services, and/or recommending alternative apps if, for some reason, the shared app is not appropriate or suitable.

In another example, the user may share a browser add-on, such as an add-on for Microsoft Edge, Mozilla Firefox, Chrome, Opera, or similar. A personal protection service may then provide services for the browser add-on. These can include, for example, detecting malicious add-ons, detecting security vulnerabilities, detecting privacy violations, providing performance and reputation services, and/or recommending alternative add-ons, as appropriate.

In another embodiment, the user may share a website. In the case of a shared website, a personal protection service may provide services such as detecting man-in-the-middle attacks, detecting phishing, detecting malicious websites, detecting security vulnerabilities, detecting privacy violations, and providing performance and reputation services. In the case of a website, the user may select the URL from the address bar of the web browser and access the share function via a context menu, long press, or similar.

In yet another embodiment, the user may share a file. In the case of a file, a personal protection service may provide various services, including detecting viruses, Trojans, other malware, and potentially unwanted programs. The service may also provide file verification, including a digital signature and/or a hash. The service may detect security vulnerabilities and/or privacy violations, and the service may provide performance and reputation services. The user may share a file such as by right-clicking on the file to access a context menu within a file browser, or via a long press on the file.

Figure 4:
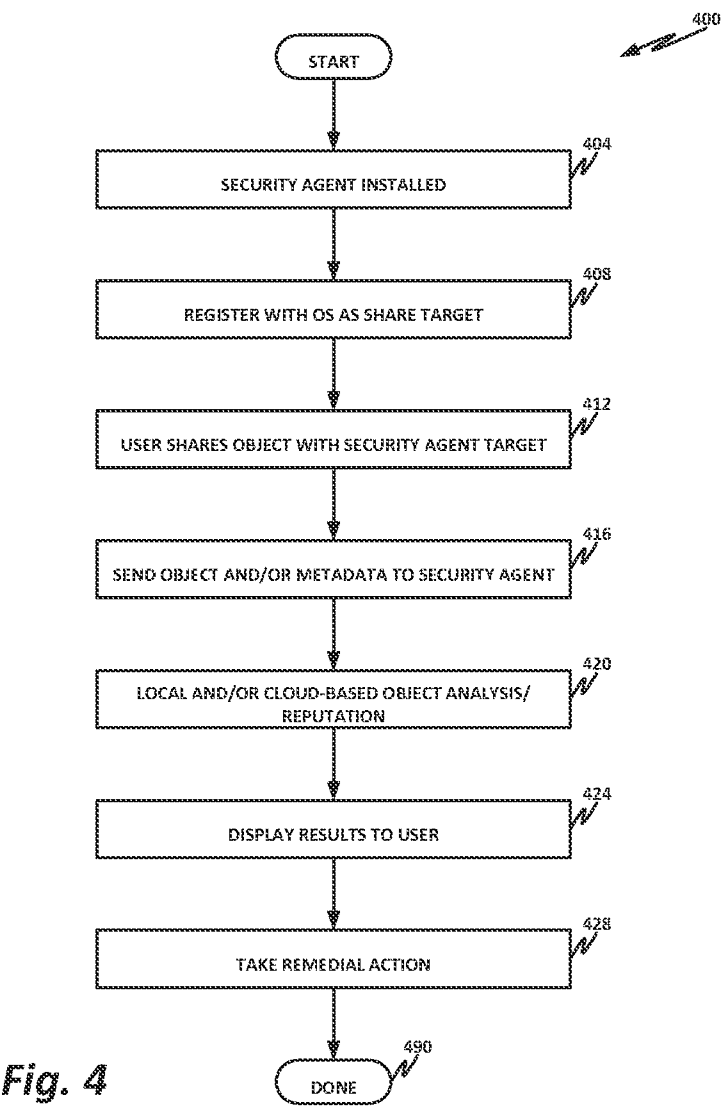
FIG. 4 is a flow chart of a method according to the present disclosure.

FIG. 4 is a flowchart of a method 400 that may be implemented according to the teachings of the present specification.

In block 404, a security agent is installed on the local device. For example, the security agent could be an antivirus or comprehensive security suite.

In block 408, the security agent registers with the OS as a share target so that the security agent appears as a target when the user operates the share function.

In block 412, a user operating a GUI shares an object with the security agent target. As described above, the object could be a file, application, app from the app store, website, URL, browser add-on, or similar.

In block 416, the OS sends the object and/or object metadata to the security agent as the target of the share operation.

In block 420, the security agent performs local and/or cloud-based object analysis to determine a reputation or other information about the object.

In block 424, the security agent may display appropriate information and results to the user such as via a GUI.

In block 428, depending on the reputation returned from block 420, the security agent may take remedial action, such as scrubbing the file, sandboxing the file, altering the file's permission, quarantining the file, subjecting the file to additional analysis, sending the file to the cloud for additional analysis, or otherwise operating on the file or object to ensure that the user's device remains safe from any adverse effects.

In block 490, the method is done.

Figure 5:
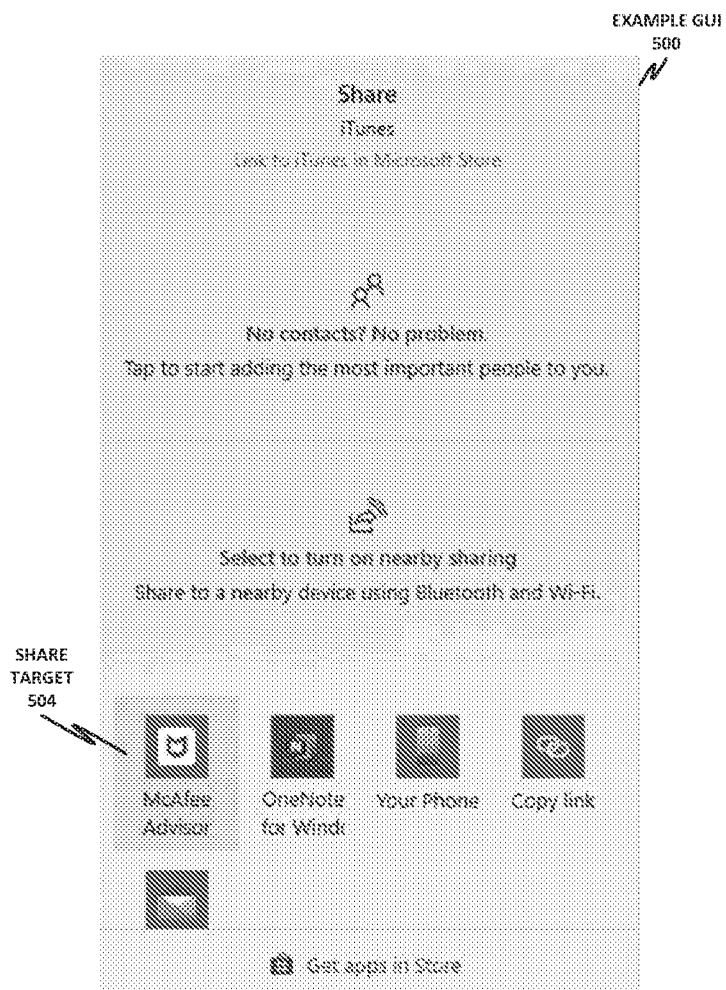

FIG. 5 is an illustration of an example GUI element 500. Example GUI element 500 illustrates the share window that is triggered by current versions of Windows 10 OSs. The share function is available in the file browser to share files, in the web browser to share URLs, on the app store to share apps, and on Microsoft Edge to share browser extensions.

When the user selects the share context with an associated share object, a window similar to GUI element 500 pops up. In this case, the user can select several share targets, such as sharing via email, copying a link to the object, sharing to a phone, sharing via OneNote, or similar. Targets could also include sharing via SMS, sharing via social media sites, or similar. In this case, a security agent known as McAfee Advisor has registered as share target 504. Thus, because McAfee Advisor has registered, it shows up as a share target when the user selects the share function. When the user selects McAfee Advisor as the share target, the shared object is send-to McAfee Advisor, or metadata about the shared object are send-to McAfee Advisor. This allows the McAfee Advisor security agent to analyze the object and take appropriate security actions.

FIG. 6 is a view of an illustrative graphical element 600. Graphical elements 600 is a window generated by the McAfee Advisor security agent, which is used to display information about the share object after the object has been analyzed. In this case, the app iTunes has been shared with the security agent. A narrative description 604 provides information about the shared app. This could also be a narrative description of a file, an object, an executable, an app, a browser extension, a URL, a website, or some other similar element. The narrative description 604 may include a description provided by a vendor of the object.

In addition to the narrative description 604, a reputation 608 may be provided for the object. Note that the reputation illustrated here is not an actual reputation generated for the iTunes application but rather is provided to illustrate some of the factors that may go into a reputation. It is expected that, in deployment, an actual reputation would be computed for an app such as the iTunes app illustrated here.

In this case, a multi-factor reputation is provided. For example, the reputation includes an overall score, a security score, a privacy score, a usability score, a reliability score, a performance score, a popularity score, and a review score. In this illustration, these scores, including the overall score, are provided on a five-star metric. Other metrics are possible, such as a percentage value between 0% and 100%, a decimal value between zero and one, or some other number, color, symbol, or other scoring mechanism.

Figure 7:
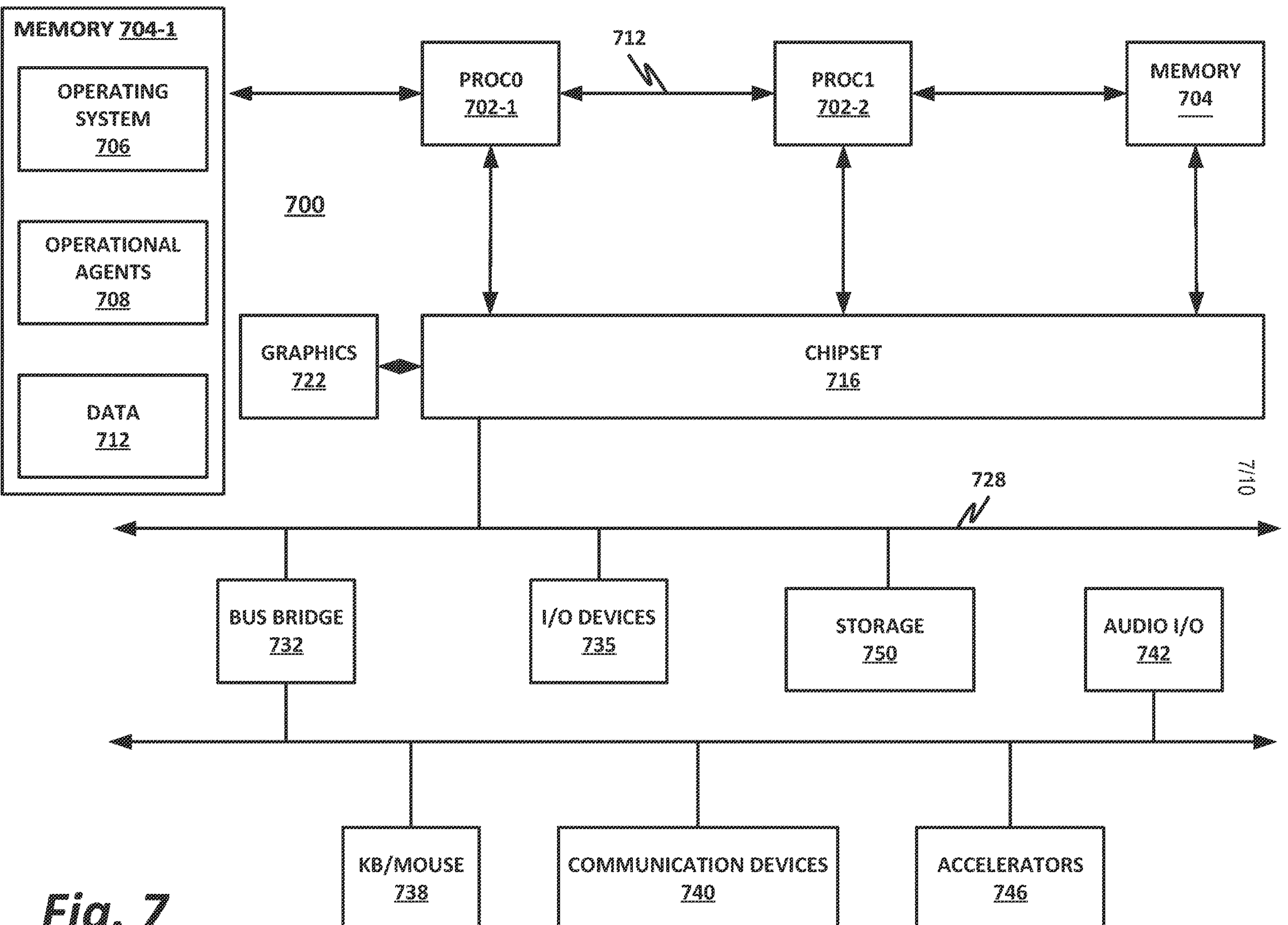
FIG. 7 is a block diagram of selected elements of a hardware platform.

FIG. 7 is a block diagram of a hardware platform 700. Although a particular configuration is illustrated here, there are many different configurations of hardware platforms, and this embodiment is intended to represent the class of hardware platforms that can provide a computing device. Furthermore, the designation of this embodiment as a "hardware platform" is not intended to require that all embodiments provide all elements in hardware. Some of the elements disclosed herein may be provided, in various embodiments, as hardware, software, firmware, microcode, microcode instructions, hardware instructions, hardware or software accelerators, or similar. Furthermore, in some embodiments, entire computing devices or platforms may be virtualized, on a single device, or in a data center where virtualization may span one or a plurality of devices. For example, in a "rackscale architecture" design, disaggregated computing resources may be virtualized into a single instance of a virtual device. In that case, all of the disaggregated resources that are used to build the virtual device may be considered part of hardware platform 700, even though they may be scattered across a data center, or even located in different data centers.

Hardware platform 700 is configured to provide a computing device. In various embodiments, a "computing device" may be or comprise, by way of nonlimiting example, a computer, workstation, server, mainframe, virtual machine (whether emulated or on a "bare metal" hypervisor), network appliance, container, IoT device, high performance computing (HPC) environment, a data center, a communications service provider infrastructure (e.g., one or more portions of an Evolved Packet Core), an in-memory computing environment, a computing system of a vehicle (e.g., an automobile or airplane), an industrial control system, embedded computer, embedded controller, embedded sensor, personal digital assistant, laptop computer, cellular telephone, internet protocol (IP) telephone, smart phone, tablet computer, convertible tablet computer, computing appliance, receiver, wearable computer, handheld calculator, or any other electronic, microelectronic, or microelectromechanical device for processing and communicating data. At least some of the methods and systems disclosed in this specification may be embodied by or carried out on a computing device.

In the illustrated example, hardware platform 700 is arranged in a point-to-point (PtP) configuration. This PtP configuration is popular for personal computer (PC) and server-type devices, although it is not so limited, and any other bus type may be used.

Hardware platform 700 is an example of a platform that may be used to implement embodiments of the teachings of this specification. For example, instructions could be stored in storage 750. Instructions could also be transmitted to the hardware platform in an ethereal form, such as via a network interface, or retrieved from another source via any suitable interconnect. Once received (from any source), the instructions may be loaded into memory 704, and may then be executed by one or more processor 702 to provide elements such as an OS 706, operational agents 708, or data 712.

Hardware platform 700 may include several processors 702. For simplicity and clarity, only processors PROC0 702-1 and PROC1 702-2 are shown. Additional processors (such as 2, 4, 8, 16, 24, 32, 64, or 128 processors) may be provided as necessary, while in other embodiments, only one processor may be provided. Details of processors 702 are not illustrated in this FIGURE, but one embodiment is illustrated in FIGURE QD. Processors may have any number of cores, such as 1, 2, 4, 8, 16, 24, 32, 64, or 128 cores.

Processors 702 may be any type of processor and may communicatively couple to chipset 716 via, for example, PtP interfaces. Chipset 716 may also exchange data with other elements, such as a high performance graphics adapter 722. In alternative embodiments, any or all of the PtP links illustrated in FIG. 7 could be implemented as any type of bus, or other configuration rather than a PtP link. In various embodiments, chipset 716 may reside on the same die or package as a processor 702 or on one or more different dies or packages. Each chipset may support any suitable number of processors 702. A chipset 716 (which may be a chipset, uncore, Northbridge, Southbridge, or other suitable logic and circuitry) may also include one or more controllers to couple other components to one or more CPUs.

Two memories, 704-1 and 704-2 are shown, connected to PROC0 702-1 and PROC1 702-2, respectively. As an example, each processor is shown connected to its memory in a direct memory access (DMA) configuration, though other memory architectures are possible, including ones in which memory 704 communicates with a processor 702 via a bus. For example, some memories may be connected via a system bus, or in a data center, memory may be accessible in a remote DMA (RDMA) configuration.

Memory 704 may include any form of volatile or nonvolatile memory including, without limitation, magnetic media (e.g., one or more tape drives), optical media, flash, random access memory (RAM), double data rate RAM (DDR RAM) nonvolatile RAM (NVRAM), static RAM (SRAM), dynamic RAM (DRAM), persistent RAM (PRAM), data-centric (DC) persistent memory (e.g., Intel Optane/3D-crosspoint), cache, Layer 1 (L1) or Layer 2 (L2) memory, on-chip memory, registers, virtual memory region, read-only memory (ROM), flash memory, removable media, tape drive, cloud storage, or any other suitable local or remote memory component or components. Memory 704 may be used for short, medium, and/or long-term storage. Memory 704 may store any suitable data or information utilized by platform logic. In some embodiments, memory 704 may also comprise storage for instructions that may be executed by the cores of processors 702 or other processing elements (e.g., logic resident on chipsets 716) to provide functionality.

In certain embodiments, memory 704 may comprise a relatively low-latency volatile main memory, while storage 750 may comprise a relatively higher-latency nonvolatile memory. However, memory 704 and storage 750 need not be physically separate devices, and in some examples may represent simply a logical separation of function (if there is any separation at all). It should also be noted that although DMA is disclosed by way of nonlimiting example, DMA is not the only protocol consistent with this specification, and that other memory architectures are available.

Certain computing devices provide main memory 704 and storage 750, for example, in a single physical memory device, and in other cases, memory 704 and/or storage 750 are functionally distributed across many physical devices. In the case of virtual machines or hypervisors, all or part of a function may be provided in the form of software or firmware running over a virtualization layer to provide the logical function, and resources such as memory, storage, and accelerators may be disaggregated (i.e., located in different physical locations across a data center). In other examples, a device such as a network interface may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, hardware instructions, microcode, programmable logic, or objects that can coordinate to achieve a logical operation.

Graphics adapter 722 may be configured to provide a human-readable visual output, such as a command-line interface (CLI) or graphical desktop such as Microsoft Windows, Apple OSX desktop, or a UNIX/Linux X Window System-based desktop. Graphics adapter 722 may provide output in any suitable format, such as a coaxial output, composite video, component video, video graphics array (VGA), or digital outputs such as digital visual interface (DVI), FPDLink, DisplayPort, or high definition multimedia interface (HDMI), by way of nonlimiting example. In some examples, graphics adapter 722 may include a hardware graphics card, which may have its own memory and its own graphics processing unit (GPU).

Chipset 716 may be in communication with a bus 728 via an interface circuit. Bus 728 may have one or more devices that communicate over it, such as a bus bridge 732, I/O devices 735, accelerators 746, communication devices 740, and a keyboard and/or mouse 738, by way of nonlimiting example. In general terms, the elements of hardware platform 700 may be coupled together in any suitable manner. For example, a bus may couple any of the components together. A bus may include any known interconnect, such as a multi-drop bus, a mesh interconnect, a fabric, a ring interconnect, a round-robin protocol, a PtP interconnect, a serial interconnect, a parallel bus, a coherent (e.g., cache coherent) bus, a layered protocol architecture, a differential bus, or a Gunning transceiver logic (GTL) bus, by way of illustrative and nonlimiting example.

Communication devices 740 can broadly include any communication not covered by a network interface and the various I/O devices described herein. This may include, for example, various USB, FireWire, Lightning, or other serial or parallel devices that provide communications.

I/O Devices 735 may be configured to interface with any auxiliary device that connects to hardware platform 700 but that is not necessarily a part of the core architecture of hardware platform 700. A peripheral may be operable to provide extended functionality to hardware platform 700, and may or may not be wholly dependent on hardware platform 700. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage, by way of nonlimiting example.

In one example, audio I/O 742 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth, or Wi-Fi audio, by way of nonlimiting example. Audio input may also be provided via similar interfaces, in an analog or digital form.

Bus bridge 732 may be in communication with other devices such as a keyboard/mouse 738 (or other input devices such as a touch screen, trackball, etc.), communication devices 740 (such as modems, network interface devices, peripheral interfaces such as PCI or PCIe, or other types of communication devices that may communicate through a network), audio I/O 742, a data storage device 744, and/or accelerators 746. In alternative embodiments, any portions of the bus architectures could be implemented with one or more PtP links.

Operating system 706 may be, for example, Microsoft Windows, Linux, UNIX, Mac OS X, iOS, MS-DOS, or an embedded or real-time operating system (including embedded or real-time flavors of the foregoing). In some embodiments, a hardware platform 700 may function as a host platform for one or more guest systems that invoke application (e.g., operational agents 708).

Operational agents 708 may include one or more computing engines that may include one or more nontransitory computer-readable mediums having stored thereon executable instructions operable to instruct a processor to provide operational functions. At an appropriate time, such as upon booting hardware platform 700 or upon a command from OS 706 or a user or security administrator, a processor 702 may retrieve a copy of the operational agent (or software portions thereof) from storage 750 and load it into memory 704. Processor 702 may then iteratively execute the instructions of operational agents 708 to provide the desired methods or functions.

As used throughout this specification, an "engine" includes any combination of one or more logic elements, of similar or dissimilar species, operable for and configured to perform one or more methods provided by the engine. In some cases, the engine may be or include a special integrated circuit designed to carry out a method or a part thereof, a field-programmable gate array (FPGA) programmed to provide a function, a special hardware or microcode instruction, other programmable logic, and/or software instructions operable to instruct a processor to perform the method. In some cases, the engine may run as a "daemon" process, background process, terminate-and-stay-resident program, a service, system extension, control panel, bootup procedure, basic in/output system (BIOS) subroutine, or any similar program that operates with or without direct user interaction. In certain embodiments, some engines may run with elevated privileges in a "driver space" associated with ring 0, 1, or 2 in a protection ring architecture. The engine may also include other hardware, software, and/or data, including configuration files, registry entries, application programming interfaces (APIs), and interactive or user-mode software by way of nonlimiting example.

In some cases, the function of an engine is described in terms of a "circuit" or "circuitry to" perform a particular function. The terms "circuit" and "circuitry" should be understood to include both the physical circuit, and in the case of a programmable circuit, any instructions or data used to program or configure the circuit.

Where elements of an engine are embodied in software, computer program instructions may be implemented in programming languages, such as an object code, an assembly language, or a high level language such as OpenCL, FORTRAN, C, C++, JAVA, or HTML. These may be used with any compatible OSs or operating environments. Hardware elements may be designed manually, or with a hardware description language such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

A network interface may be provided to communicatively couple hardware platform 700 to a wired or wireless network or fabric. A "network," as used throughout this specification, may include any communicative platform operable to exchange data or information within or between computing devices, including, by way of nonlimiting example, a local network, a switching fabric, an ad-hoc local network, Ethernet (e.g., as defined by the IEEE 802.3 standard), Fiber Channel, InfiniBand, Wi-Fi, or other suitable standard. Intel Omni-Path Architecture (OPA), TrueScale, Ultra Path Interconnect (UPI) (formerly called QPI or KTI), FibreChannel, Ethernet, FibreChannel over Ethernet (FCoE), InfiniBand, PCI, PCIe, fiber optics, millimeter wave guide, an internet architecture, a packet data network (PDN) offering a communications interface or exchange between any two nodes in a system, a local area network (LAN), metropolitan area network (MAN), wide area network (WAN), wireless local area network (WLAN), virtual private network (VPN), intranet, plain old telephone system (POTS), or any other appropriate architecture or system that facilitates communications in a network or telephonic environment, either with or without human interaction or intervention. A network interface may include one or more physical ports that may couple to a cable (e.g., an Ethernet cable, other cable, or waveguide).

In some cases, some or all of the components of hardware platform 700 may be virtualized, in particular the processor(s) and memory. For example, a virtualized environment may run on OS 706, or OS 706 could be replaced with a hypervisor or virtual machine manager. In this configuration, a virtual machine running on hardware platform 700 may virtualize workloads. A virtual machine in this configuration may perform essentially all of the functions of a physical hardware platform.

In a general sense, any suitably-configured processor can execute any type of instructions associated with the data to achieve the operations illustrated in this specification. Any of the processors or cores disclosed herein could transform an element or an article (for example, data) from one state or thing to another state or thing. In another example, some activities outlined herein may be implemented with fixed logic or programmable logic (for example, software and/or computer instructions executed by a processor).

Various components of the system depicted in FIG. 7 may be combined in a SoC architecture or in any other suitable configuration. For example, embodiments disclosed herein can be incorporated into systems including mobile devices such as smart cellular telephones, tablet computers, personal digital assistants, portable gaming devices, and similar. These mobile devices may be provided with SoC architectures in at least some embodiments. An example of such an embodiment is provided in FIG. 8. Such an SoC (and any other hardware platform disclosed herein) may include analog, digital, and/or mixed-signal, radio frequency (RF), or similar processing elements. Other embodiments may include a multichip module (MCM), with a plurality of chips located within a single electronic package and configured to interact closely with each other through the electronic package. In various other embodiments, the computing functionalities disclosed herein may be implemented in one or more silicon cores in application-specific integrated circuits (ASICs), FPGAs, and other semiconductor chips.

Figure 8:
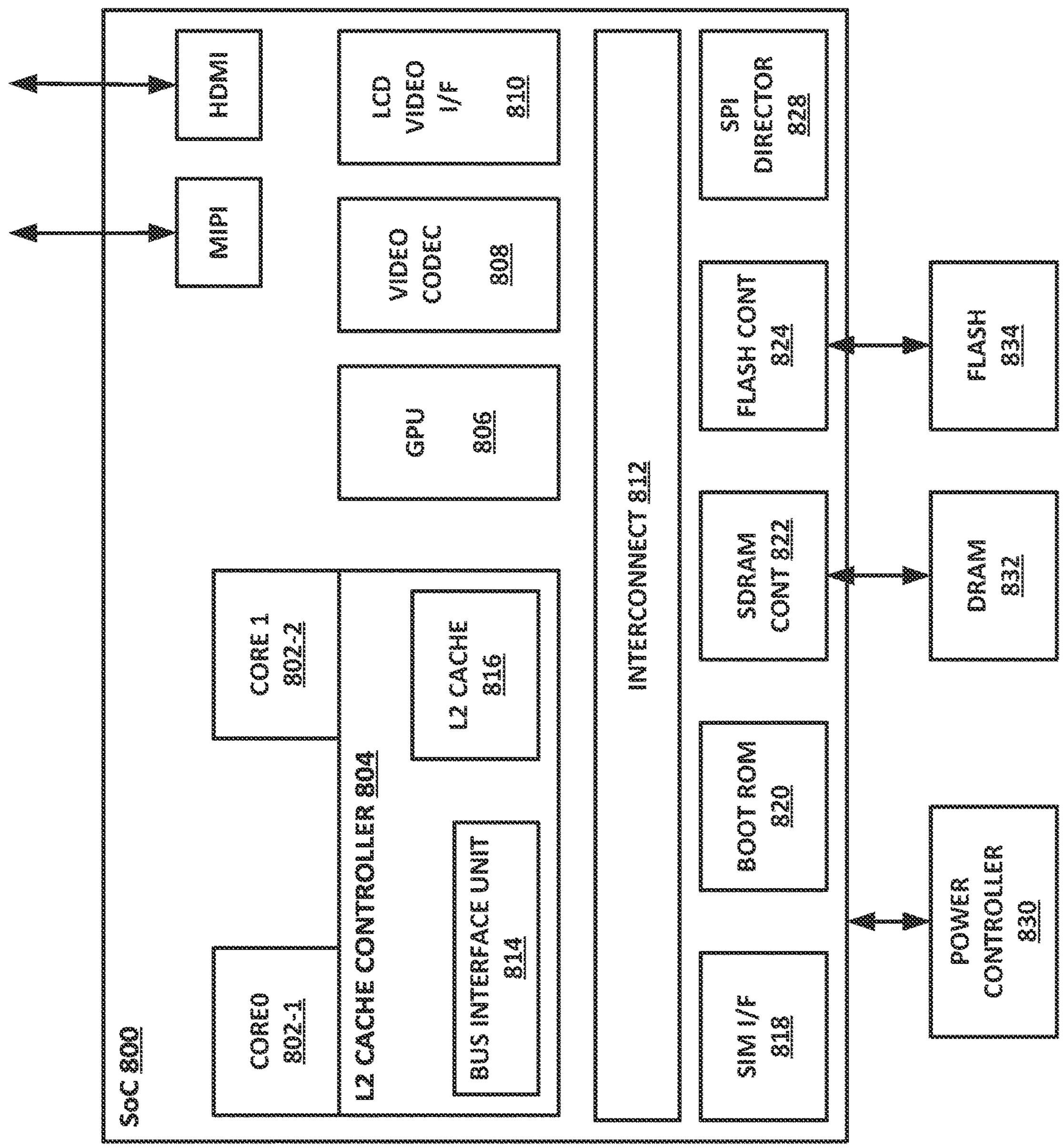
FIG. 8 is a block diagram of selected elements of a system-on-a-chip (SoC).

FIG. 8 is a block illustrating selected elements of an example SoC 800. At least some of the teachings of the present specification may be embodied on an SoC 800, or may be paired with an SoC 800. SoC 800 may include, or may be paired with, an advanced reduced instruction set computer machine (ARM) component. For example, SoC 800 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 800 could also be integrated into, for example, a PC, server, video processing components, laptop computer, notebook computer, netbook, or touch-enabled device.

As with hardware platform 700 above, SoC 800 may include multiple cores 802-1 and 802-2. In this illustrative example, SoC 800 also includes an L2 cache control 804, a GPU 806, a video codec 808, a liquid crystal display (LCD) I/F 810 and an interconnect 812. L2 cache control 804 can include a bus interface unit 814, a L2 cache 816. Liquid crystal display (LCD) I/F 810 may be associated with mobile industry processor interface (MIPI)/HDMI links that couple to an LCD.

SoC 800 may also include a subscriber identity module (SIM) I/F 818, a boot ROM 820, a synchronous dynamic random access memory (SDRAM) controller 822, a flash controller 824, a serial peripheral interface (SPI) director 828, a suitable power control 830, a dynamic RAM (DRAM) 832, and flash 834. In addition, one or more embodiments include one or more communication capabilities, interfaces, and features such as instances of Bluetooth, a 3G modem, a global positioning system (GPS), and an 802.11 Wi-Fi.

Designers of integrated circuits such as SoC 800 (or other integrated circuits) may use intellectual property (IP) blocks to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

Figure 9:
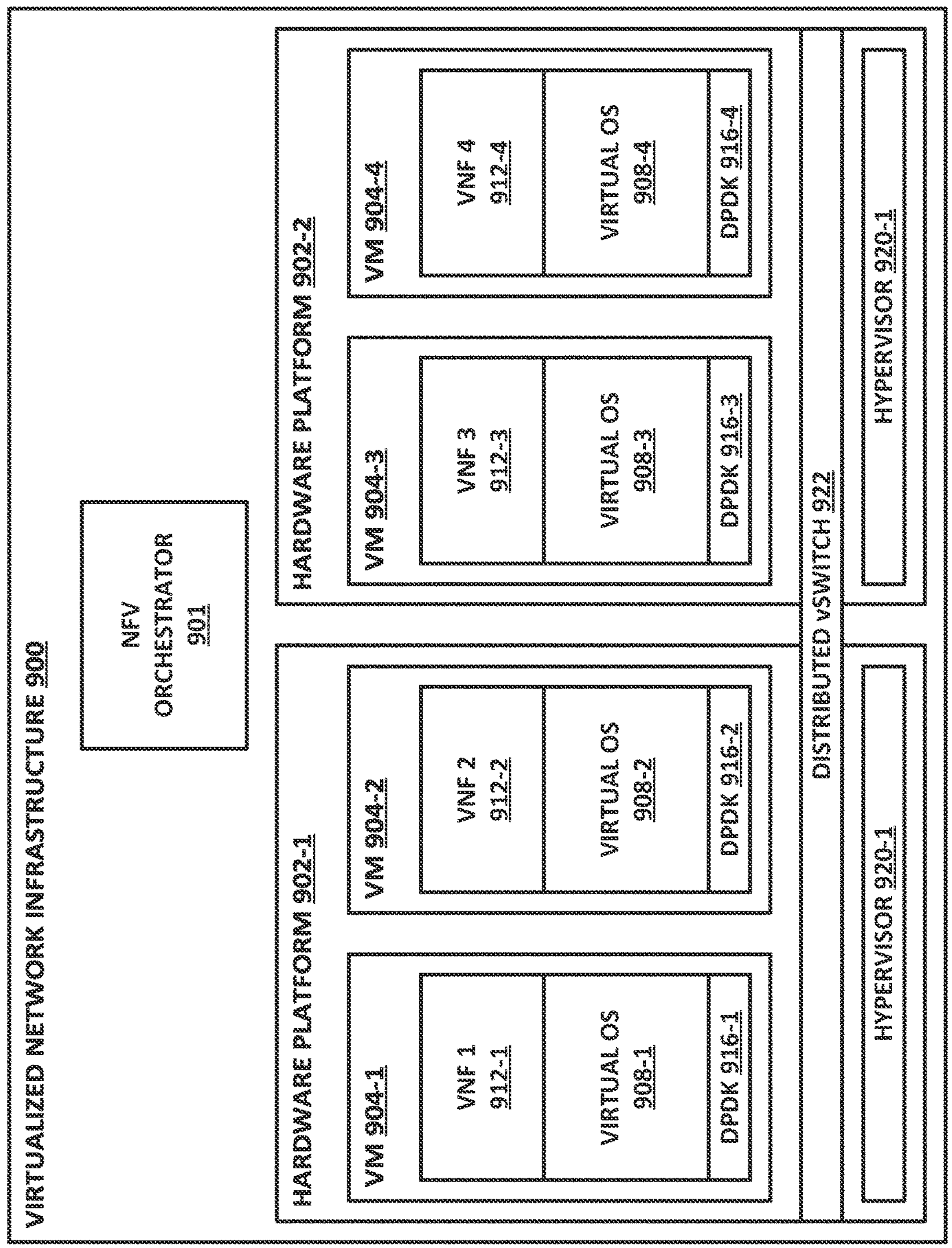
FIG. 9 is a block diagram of selected elements of a network function virtualization (NFV) infrastructure.

FIG. 9 is a block diagram of a NFV infrastructure 900. In some cases, the server-based functions (such as to provide a cloud reputation for a shared object) may be provided via virtualization, which may include NFV or other virtualization options.

NFV is an aspect of network virtualization that is generally considered distinct from, but that can still interoperate with, software-defined networking (SDN). For example, virtual network functions (VNFs) may operate within the data plane of an SDN deployment. NFV was originally envisioned as a method for providing reduced capital expenditure (Capex) and operating expenses (Opex) for telecommunication services. One feature of NFV is replacing proprietary, special-purpose hardware appliances with virtual appliances running on commercial off-the-shelf (COTS) hardware within a virtualized environment. In addition to Capex and Opex savings, NFV provides a more agile and adaptable network. As network loads change, VNFs can be provisioned ("spun up") or removed ("spun down") to meet network demands. For example, in times of high load, more load balancing VNFs may be spun up to distribute traffic to more workload servers (which may themselves be virtual machines). In times when more suspicious traffic is experienced, additional firewalls or deep packet inspection (DPI) appliances may be needed.

Because NFV started out as a telecommunications feature, many NFV instances are focused on telecommunications. However, NFV is not limited to telecommunication services. In a broad sense, NFV includes one or more VNFs running within a network function virtualization infrastructure (NFVI), such as NFVI 900. Often, the VNFs are inline service functions that are separate from workload servers or other nodes. These VNFs can be chained together into a service chain, which may be defined by a virtual subnetwork, and which may include a serial string of network services that provide behind-the-scenes work, such as security, logging, billing, and similar.

In the example of FIG. 9, an NFV orchestrator 901 manages a number of the VNFs 912 running on an NFVI 900. NFV requires nontrivial resource management, such as allocating a very large pool of compute resources among appropriate numbers of instances of each VNF, managing connections between VNFs, determining how many instances of each VNF to allocate, and managing memory, storage, and network connections. This may require complex software management, thus making NFV orchestrator 901 a valuable system resource. Note that NFV orchestrator 901 may provide a browser-based or graphical configuration interface, and in some embodiments may be integrated with SDN orchestration functions.

Note that NFV orchestrator 901 itself may be virtualized (rather than a special-purpose hardware appliance). NFV orchestrator 901 may be integrated within an existing SDN system, wherein an operations support system (OSS) manages the SDN. This may interact with cloud resource management systems (e.g., OpenStack) to provide NFV orchestration. An NFVI 900 may include the hardware, software, and other infrastructure to enable VNFs to run. This may include a hardware platform 902 on which one or more VMs 904 may run. For example, hardware platform 902-1 in this example runs VMs 904-1 and 904-2. Hardware platform 902-2 runs VMs 904-3 and 904-4. Each hardware platform may include a hypervisor 920, virtual machine manager (VMM), or similar function, which may include and run on a native (bare metal) OS, which may be minimal so as to consume very few resources.

Hardware platforms 902 may be or comprise a rack or several racks of blade or slot servers (including, e.g., processors, memory, and storage), one or more data centers, other hardware resources distributed across one or more geographic locations, hardware switches, or network interfaces. An NFVI 900 may also include the software architecture that enables hypervisors to run and be managed by NFV orchestrator 901.

Running on NFVI 900 are a number of VMs 904, each of which in this example is a VNF providing a virtual service appliance. Each VM 904 in this example includes an instance of the Data Plane Development Kit (DPDK) 916 (e.g., 916-1, 916-2, 916-3, 916-4), a respective virtual OS 908 (e.g., 908-1, 908-2, 908-3, 908-4), and an application providing the VNF Virtualized network functions could include, as nonlimiting and illustrative examples, firewalls, intrusion detection systems, load balancers, routers, session border controllers, DPI services, network address translation (NAT) modules, or call security association.

The illustration of FIG. 9 shows that a number of VNFs 904 have been provisioned and exist within NFVI 900. This FIGURE does not necessarily illustrate any relationship between the VNFs and the larger network, or the packet flows that NFVI 900 may employ.

The illustrated DPDK instances 916 provide a set of highly-optimized libraries for communicating across a virtual switch (vSwitch) 922. Like VMs 904, vSwitch 922 is provisioned and allocated by a hypervisor 920. Each hardware platform 902 may have its own hypervisor (e.g., 920-1 for 902-1 and 920-2 for 902-2). The hypervisor uses a network interface to connect the hardware platform to the data center fabric (e.g., a host fabric interface (HFI)). This HFI may be shared by all VMs 904 running on a hardware platform 902. Thus, a vSwitch may be allocated to switch traffic between VMs 904. The vSwitch may be a pure software vSwitch (e.g., a shared memory vSwitch), which may be optimized so that data are not moved between memory locations, but rather, the data may stay in one place, and pointers may be passed between VMs 904 to simulate data moving between ingress and egress ports of the vSwitch. The vSwitch may also include a hardware driver (e.g., a hardware network interface IP block that switches traffic, but that connects to virtual ports rather than physical ports). In this illustration, a distributed vSwitch 922 is illustrated, wherein vSwitch 922 is shared between two or more physical hardware platforms 902.

Figure 10:
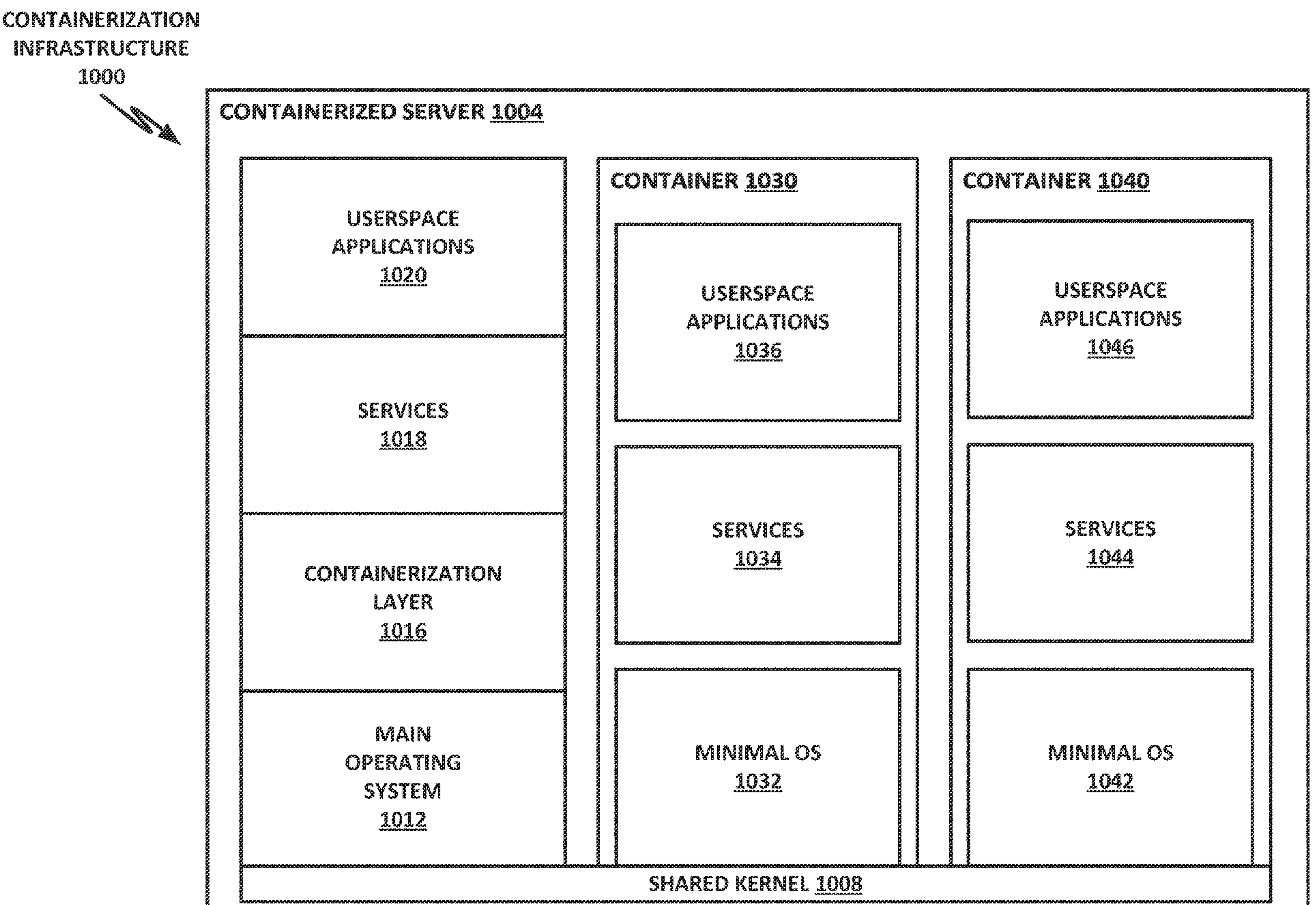
FIG. 10 is a block diagram of selected elements of a containerization infrastructure.

FIG. 10 is a block diagram of selected elements of a containerization infrastructure 1000. Like virtualization, containerization is a popular form of providing a guest infrastructure. In some cases, the server-based functions (such as to provide a cloud reputation for a shared object) may be provided via containers and/or microservices.

Containerization infrastructure 1000 runs on a hardware platform such as containerized server 1004. Containerized server 1004 may provide a number of processors, memory, one or more network interfaces, accelerators, and/or other hardware resources.

Running on containerized server 1004 is a shared kernel 1008. One distinction between containerization and virtualization is that containers run on a common kernel with the main OS and with each other. In contrast, in virtualization, the processor and other hardware resources are abstracted or virtualized, and each virtual machine provides its own kernel on the virtualized hardware.

Running on shared kernel 1008 is main OS 1012. Commonly, main OS 1012 is a UNIX or Linux-based OS, although containerization infrastructure is also available for other types of systems, including Microsoft Windows systems and Macintosh systems. Running on top of main OS 1012 is a containerization layer 1016. For example, Docker is a popular containerization layer that runs on a number of OSs, and relies on the Docker daemon. Newer OSs (including Fedora Linux 32 and later) that use version 2 of the kernel control groups service (cgroups v2) feature appear to be incompatible with the Docker daemon. Thus, these systems may run with an alternative known as Podman that provides a containerization layer without a daemon.

Various factions debate the advantages and/or disadvantages of using a daemon-based containerization layer versus one without a daemon, like Podman. Such debates are outside the scope of the present specification, and when the present specification speaks of containerization, it is intended to include containerization layers, whether or not they require the use of a daemon.

Main OS 1012 may also include a number of services 1018, which provide services and interprocess communication to userspace applications 1020.

Services 1018 and userspace applications 1020 in this illustration are independent of any container.

As discussed above, a difference between containerization and virtualization is that containerization relies on a shared kernel. However, to maintain virtualization-like segregation, containers do not share interprocess communications, services, or many other resources. Some sharing of resources between containers can be approximated by permitting containers to map their internal file systems to a common mount point on the external file system. Because containers have a shared kernel with the main OS 1012, they inherit the same file and resource access permissions as those provided by shared kernel 1008. For example, one popular application for containers is to run a plurality of web servers on the same physical hardware. The Docker daemon provides a shared socket, docker.sock, that is accessible by containers running under the same Docker daemon. Thus, one container can be configured to provide only a reverse proxy for mapping hypertext transfer protocol (HTTP) and hypertext transfer protocol secure (HTTPS) requests to various containers. This reverse proxy container can listen on docker.sock for newly spun up containers. When a container spins up that meets certain criteria, such as by specifying a listening port and/or virtual host, the reverse proxy can map HTTP or HTTPS requests to the specified virtual host to the designated virtual port. Thus, only the reverse proxy host may listen on ports 80 and 443, and any request to subdomain1.example.com may be directed to a virtual port on a first container, while requests to subdomain2.example.com may be directed to a virtual port on a second container.

Other than this limited sharing of files or resources, which generally is explicitly configured by an administrator of containerized server 1004, the containers themselves are completely isolated from one another. However, because they share the same kernel, it is relatively easier to dynamically allocate compute resources such as CPU time and memory to the various containers. Furthermore, it is common practice to provide only a minimum set of services on a specific container, and the container does not need to include a full bootstrap loader because it shares the kernel with a containerization host (i.e. containerized server 1004).

Thus, "spinning up" a container is often relatively faster than spinning up a new virtual machine that provides a similar service. Furthermore, a containerization host does not need to virtualize hardware resources, so containers access those resources natively and directly. While this provides some theoretical advantages over virtualization, modern hypervisors—especially type 1, or "bare metal," hypervisors—provide such near-native performance that this advantage may not always be realized.

In this example, containerized server 1004 hosts two containers, namely container 1030 and container 1040.

Container 1030 may include a minimal OS 1032 that runs on top of shared kernel 1008. Note that a minimal OS is provided as an illustrative example, and is not mandatory. In fact, container 1030 may perform as full an OS as is necessary or desirable. Minimal OS 1032 is used here as an example simply to illustrate that in common practice, the minimal OS necessary to support the function of the container (which in common practice, is a single or monolithic function) is provided.

On top of minimal OS 1032, container 1030 may provide one or more services 1034. Finally, on top of services 1034, container 1030 may also provide a number of userspace applications 1036, as necessary.

Container 1040 may include a minimal OS 1042 that runs on top of shared kernel 1008. Note that a minimal OS is provided as an illustrative example, and is not mandatory. In fact, container 1040 may perform as full an OS as is necessary or desirable. Minimal OS 1042 is used here as an example simply to illustrate that in common practice, the minimal OS necessary to support the function of the container (which in common practice, is a single or monolithic function) is provided.

On top of minimal OS 1042, container 1040 may provide one or more services 1044. Finally, on top of services 1044, container 1040 may also provide a number of userspace applications 1046, as necessary.

Using containerization layer 1016, containerized server 1004 may run a number of discrete containers, each one providing the minimal OS and/or services necessary to provide a particular function. For example, containerized server 1004 could include a mail server, a web server, a secure shell server, a file server, a weblog, cron services, a database server, and many other types of services. In theory, these could all be provided in a single container, but security and modularity advantages are realized by providing each of these discrete functions in a discrete container with its own minimal OS necessary to provide those services.

The foregoing outlines features of several embodiments so that those skilled in the art may better understand various aspects of the present disclosure. The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

In order to aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A computing apparatus, comprising:

a hardware platform comprising a processor and a memory;

an operating system (OS) comprising a graphical user interface (GUI) with a share function comprising a context menu labeled substantially "Share" or "Send to", and an interface to register a share target for the share function; and instructions encoded within the memory to provide a security agent, the instructions to instruct the processor to:

register the security agent as a share target for the share function;

receive from the OS a notification that a user shared an executable object via the share function with the security agent as the share target;

responsive to the notification, initiate a security scan or reputation action for the executable object;

receive a security or reputation response from the security scan or reputation action; and based at least in part on the security scan or reputation response, display a security or reputation notification via the GUI.

2. The computing apparatus of claim 1, wherein the OS is a Microsoft Windows OS, a Macintosh OSX, an iOS, an Android OS, a Linux OS, or a UNIX-based OS.

3. The computing apparatus of claim 1, wherein the share function is a "send to" function.

4. The computing apparatus of claim 1, wherein the security agent comprises instructions to analyze the executable object locally.

5. The computing apparatus of claim 1, wherein the security agent comprises instructions to query a cloud service for security or reputation information about the executable object.

6. The computing apparatus of claim 1, wherein the executable object is an application, website, URL, file, browser extension, browser add-on, contact, email, online media file, or object scannable by a security agent.

7. The computing apparatus of claim 1, wherein the share function is a built-in share function of the OS.

8. The computing apparatus of claim 1, wherein the instructions are further to take a remedial action based at least in part on the security or reputation response.

9. The computing apparatus of claim 1, wherein the security or reputation response includes a reputation for at least one of maliciousness, data security, data privacy, phishing, adware, malware, or utility.

10. One or more tangible, nontransitory computer-readable storage media having stored thereon executable instructions to:

register a security agent as a share target for a share function of an operating system (OS), wherein the share function comprises a context menu item labeled substantially "Share" or "Send to," and wherein the OS provides a shared object-to-target infrastructure;

receive a notification that an executable object has been shared via the share function;

responsive to the notification, initiate a security or reputation transaction for the executable object;

receive a security or reputation result from the security or reputation transaction; and display the security or reputation result to an end user via a graphical user interface (GUI) of the OS.

11. The one or more tangible, nontransitory computer-readable media of claim 10, wherein the share function has a “send to” label.

12. The one or more tangible, nontransitory computer-readable media of claim 10, wherein the instructions are to query a cloud service for security or reputation information about the executable object.

13. The one or more tangible, nontransitory computer-readable media of claim 10, wherein the share function is a built-in share function of the OS.

14. The one or more tangible, nontransitory computer-readable media of claim 10, wherein the instructions are further to take a remedial action based at least in part on the security or reputation response.

15. A computer-implemented method, comprising:

registering a security agent program as a user-selectable share target for a share function of an operating system (OS), wherein the share function comprises a context menu item labeled substantially “Share” or “Send to”;

receiving from the OS a notification that a user shared an executable object via the share function with the security agent program a share target;

responsive to the notification, requesting a reputation for the executable object;

receiving a reputation for the executable object; and based at least in part on the reputation, notifying an end user of the reputation and/or taking a remedial action.

16. The method of claim 15, further comprising analyzing the executable object locally.

17. The method of claim 15, further comprising querying a cloud service for security or reputation information about the executable object.

* * * * *